United States Patent
Mogamiya

(10) Patent No.: US 8,059,949 B2
(45) Date of Patent: Nov. 15, 2011

(54) GYRO-SENSOR MOUNTING STRUCTURE IN A CAMERA HAVING AN IMAGE-STABILIZING FUNCTION

(75) Inventor: Makoto Mogamiya, Tokyo (JP)

(73) Assignee: Hoya Corporation, Tokyo (JP)

(*) Notice: Subject to any disclaimer, the term of this patent is extended or adjusted under 35 U.S.C. 154(b) by 672 days.

(21) Appl. No.: 11/873,533

(22) Filed: Oct. 17, 2007

(65) Prior Publication Data
US 2008/0181592 A1 Jul. 31, 2008

(30) Foreign Application Priority Data
Oct. 18, 2006 (JP) ................................ 2006-283539

(51) Int. Cl.
*G03B 17/00* (2006.01)
(52) U.S. Cl. .......................................... 396/53; 74/5 R
(58) Field of Classification Search ..................... 396/53, 396/52; 348/208.7; 73/503.3, 504.02, 504.08; 74/5 R, 5.22, 5.6 A, 5.6 D, 5.6 E, 5.95
See application file for complete search history.

(56) References Cited

U.S. PATENT DOCUMENTS

| | | | |
|---|---|---|---|
| 4,415,240 A | 11/1983 | Nishioka et al. | |
| 4,610,513 A | 9/1986 | Nishioka et al. | |
| 5,485,316 A | 1/1996 | Mori et al. | |
| 5,594,169 A * | 1/1997 | Field et al. | 73/504.14 |
| 5,761,544 A * | 6/1998 | Sato et al. | 396/53 |
| 5,816,097 A * | 10/1998 | Park | 74/5 R |
| 6,796,177 B2 * | 9/2004 | Mori | 73/504.02 |
| 6,965,397 B1 * | 11/2005 | Honey et al. | 348/208.2 |
| 7,286,163 B2 * | 10/2007 | Hara et al. | 348/208.11 |
| 2003/0219243 A1 * | 11/2003 | Tanaka et al. | 396/72 |
| 2007/0146489 A1 | 6/2007 | Kosako et al. | |
| 2007/0182825 A1 | 8/2007 | Nomura et al. | |
| 2007/0212041 A1 | 9/2007 | Kosako et al. | |
| 2007/0231064 A1 * | 10/2007 | Carnevali | 403/328 |
| 2007/0269195 A1 | 11/2007 | Uenaka | |
| 2008/0053224 A1 * | 3/2008 | Tsuji et al. | 73/504.12 |
| 2009/0033751 A1 * | 2/2009 | Hasuda | 348/208.99 |
| 2010/0282507 A1 * | 11/2010 | Ludwig | 174/541 |

FOREIGN PATENT DOCUMENTS
JP 56-20428 2/1981
(Continued)

OTHER PUBLICATIONS
Machine translation of JP 2005-181463A.*
(Continued)

*Primary Examiner* — Rodney Fuller
*Assistant Examiner* — Linda Smith
(74) *Attorney, Agent, or Firm* — Greenblum & Bernstein P.L.C.

(57) ABSTRACT

A gyro-sensor mounting structure in a camera having an image-stabilizing function, the camera including a first gyro sensor and a second gyro sensor for detecting rotations about two axes, respectively, which are mutually orthogonal to each other and orthogonal to an optical axis of a photographic lens, the gyro-sensor mounting structure including a sensor mounting member supporting the first and second gyro sensors; a stationary member to which the sensor mounting member is fixed, positioned inside the camera; four receiving portions the sensor mounting member or the stationary member to lie in a plane orthogonal to the optical axis and be positioned at four vertexes of an imaginary square, respectively; and two, three or four engaging members supported by the other of the sensor mounting member and the stationary member and engaged with corresponding receiving portions.

19 Claims, 9 Drawing Sheets

FOREIGN PATENT DOCUMENTS

| | | |
|---|---|---|
| JP | 2-140519 | 11/1990 |
| JP | 5-119272 | 5/1993 |
| JP | 5-157967 | 6/1993 |
| JP | 7-159834 | 6/1995 |
| JP | 7-294263 | 11/1995 |
| JP | 2503997 | 4/1996 |
| JP | 8-201867 | 8/1996 |
| JP | 8-320440 | 12/1996 |
| JP | 10-047968 | 2/1998 |
| JP | 2000-275547 | 10/2000 |
| JP | 2002-182126 | 6/2002 |
| JP | 2002-311487 | 10/2002 |
| JP | 2003-021863 | 1/2003 |
| JP | 2004-361783 | 12/2004 |
| JP | 2005-181463 | 7/2005 |
| JP | 2005-345787 | 12/2005 |

OTHER PUBLICATIONS

English language Abstract of JP 2005-181463.
English language Abstract of JP 5-119272.
English language Abstract of JP 5-157967.
English language Abstract of JP 8-320440.
English language Abstract of JP 2000-275547.
English language Abstract of JP 2002-182126.
English language Abstract of JP 2005-345787.
English language translation of Japan Office action.

\* cited by examiner

GYRO-SENSOR MOUNTING STRUCTURE IN A CAMERA HAVING AN IMAGE-STABILIZING FUNCTION

BACKGROUND OF THE INVENTION

1. Field of the Invention

The present invention relates to a camera having an image-stabilizing function, and in particular relates to a gyro-sensor mounting structure in a camera having an image-stabilizing function.

2. Description of the Related Art

In cameras with an image-stabilizing function (hand-shake correction function), an X-axis gyro sensor and a Y-axis gyro sensor which detect rotations (angular velocities) about an X-axis and a Y-axis to detect camera shake (hand shake) of the camera in the X-direction and the Y-direction thereof, respectively, are mounted to a gyro-sensor mounting plate. This gyro-sensor mounting plate is fixed to an internal stationary member of the camera.

In such cameras with an image-stabilizing function, when a correction lens element or an image pickup device is moved to cancel out camera shake (hand shake) in directions orthogonal to the optical axis of the correction lens element or the image pickup device, vibrations created by movements of the correction lens element or the image pickup device travel to the camera body or the lens barrel from the correction lens element or the image pickup device. In addition, in the case of SLR cameras with an image-stabilizing function, vibrations created by a rotation (swing-up movement) of a quick-return mirror installed in the camera travel to the camera body or the lens barrel from the quick-return mirror when the quick-return mirror rotates since the quick-return mirror rotates (swings up) upon a shutter release button being depressed.

The degree of vibration when the quick-return mirror rotates varies according to positions of the camera body and the lens barrel. Therefore, if vibrations transmitted to the X-axis gyro sensor and the Y-axis gyro sensor through the camera body or the lens barrel do not exert a large influence upon either the X-axis gyro sensor or the Y-axis gyro sensor, each of the X-axis gyro sensor and the Y-axis gyro sensor can detect camera shake with precision. However, if such vibrations transmitted to the X-axis gyro sensor and the Y-axis gyro sensor exert a large influence thereupon, each of the X-axis gyro sensor and the Y-axis gyro sensor cannot detect camera shake with precision.

However, since there is only one manner of mounting a gyro-sensor mounting plate, to which the X-axis gyro sensor and the Y-axis gyro sensor are mounted, to an internal mounting portion (stationary portion) of the camera body in conventional cameras having an image-stabilizing function, i.e., since the gyro-sensor mounting plate cannot be mounted to an internal mounting portion of the camera body in any other mounting manner, the X-axis gyro sensor and the Y-axis gyro sensor together with the gyro-sensor mounting plate need to be replaced by other ones mounted to another gyro-sensor mounting plate if vibrations transmitted to the X-axis gyro sensor and the Y-axis gyro sensor through the camera body or the lens barrel exert a large influence upon the X-axis gyro sensor and the Y-axis gyro sensor.

Additionally, the manner of transmission of the aforementioned vibrations to the X-axis gyro sensor and the Y-axis gyro sensor differs according to specifications of the camera (e.g., the dimensions or the material properties of a camera body to which the gyro sensors are mounted). Therefore, in the case of applying the X-axis gyro sensor and the Y-axis gyro sensor to various cameras of different specifications, it is conventionally the case that an appropriate X-axis gyro sensor and an appropriate Y-axis gyro sensor need to be selected from among various gyro sensors of different specifications for each camera, which causes an increase in the cost of production.

SUMMARY OF THE INVENTION

The present invention provides a gyro-sensor mounting structure in a camera having an image-stabilizing function, wherein the installation positions of the first and second gyro sensors to an internal mounting portion of a camera body can be easily changed even though the gyro-sensor mounting structure is simple and the gyro-sensor mounting structure is applicable to various cameras of different specifications.

According to an aspect of the present invention, a gyro-sensor mounting structure is provided in a camera having an image-stabilizing function, the camera including a first gyro sensor and a second gyro sensor for detecting rotations about two axes, respectively, which are mutually orthogonal to each other and orthogonal to an optical axis of a photographic lens, the gyro-sensor mounting structure including a sensor mounting member which supports the first gyro sensor and the second gyro sensor; a stationary member to which the sensor mounting member is fixed and which is positioned inside the camera; four receiving portions having the same specifications formed on one of the sensor mounting member and the stationary member to lie in a plane orthogonal to the optical axis and to be positioned at four vertexes of an imaginary square, respectively, a side of the imaginary square being parallel to one of the two axes; and at least two and no more than four engaging members having the same specifications and supported by the other of the sensor mounting member and the stationary member and respectively engaged with corresponding receiving portions. According to this construction, the sensor mounting member, which supports the first gyro sensor and the second gyro sensor, can be fixed to the stationary member by making at least two and no more than four engaging members having the same specifications engaged with corresponding receiving portions of the four receiving portions that are positioned at the four vertexes of an imaginary square, respectively.

Therefore, in the case where vibrations caused by movements of one or more internal movable elements of the camera are transmitted to the first gyro sensor and the second gyro sensor to exert a large influence thereupon, the installation positions of the first gyro sensor and the second gyro sensor can be easily changed by rotating the sensor mounting member at an angle of 90, 180 or 270 degrees relative to the stationary member and thereafter engaging the engaging members with the corresponding receiving portions, respectively. Moreover, in any of the four installation positions (angular positions), the first gyro sensor can surely detect rotation about one of the two axes (X and Y axes) orthogonal to each other while the second gyro sensor can surely detect rotation about the other axis.

Moreover, the gyro-sensor mounting structure becomes applicable to various cameras of different specifications.

Furthermore, the gyro-sensor mounting structure is simple, and accordingly can be achieved at a low cost.

It is desirable for each of the four receiving portions to include a screw hole formed in the stationary member, and for each of the engaging members includes a set screw including a male screw portion and a head portion, the set screws extending through the sensor mounting member with the male screw portions of the set screws being respectively screwed into the screw holes of the corresponding receiving portions to hold the sensor mounting member between the head portions of the set screws and the stationary member.

It is desirable for each of the four receiving portions to include a through hole formed in the sensor mounting member. Each of the engaging members includes a set screw including a male screw portion and a head portion, and passes through the stationary member and the through hole with the head portions of the set screws being in contact with the stationary member on a surface thereof opposite from the sensor mounting member. The gyro-sensor mounting structure further includes at least two and no more than four nuts, each of which is screwed on an end of the male screw portion of a corresponding set screw that projects from the through hole to hold the sensor mounting member between the nuts and the head portions of the set screws.

It is desirable for each of the four receiving portions to includes a through hole or a bottomed hole which is formed in one of the stationary member and the sensor mounting member. Each of the engaging members includes an engaging pin which includes an insertion portion and a head portion, at least the insertion portion being made of a resilient material. The insertion portion extends through the other of the stationary member and the sensor mounting member and is greater in diameter in a free state than the one of the through hole and the bottomed hole. The other of the stationary member and the sensor mounting member is held between the head portions of the engaging members and the one of the stationary member and the sensor mounting member with the insertion portions of the engaging pins being respectively fitted into the through holes or the bottomed holes of corresponding receiving portions.

It is desirable for the sensor mounting member to include at least two and no more than four shock absorbing members made of a resilient material which are fixed to the stationary member by corresponding the engaging members, and a gyro-sensor mounting plate which supports the first gyro sensor and the second gyro sensor and is supported by the shock absorbing members to be spaced from the stationary member. According to this construction, the gyro-sensor mounting plate, which supports the first gyro sensor and the second gyro sensor, is supported by the shock absorbing members to be spaced from the stationary member, and vibrations transmitted from an internal device of the camera to the first gyro sensor and the second gyro sensor are absorbed by the shock absorbing members. Therefore, such vibrations are not easily transmitted to either of the first and second gyro sensors from the internal device of the camera.

It is desirable for the gyro-sensor mounting plate to be square in shape as viewed from front of the camera.

It is desirable for each of the shock absorbing members to be formed in a cylinder.

It is desirable for the stationary member to include a frame-shaped projecting portion which projects from a front surface of the stationary member, the four receiving portions being formed on a front surface of the frame-shaped projecting portion.

It is desirable for the stationary member to be fixed to an internal surface of a rear wall of a camera body of the camera.

In an embodiment, a gyro-sensor mounting structure is provided in a camera having an image-stabilizing function, the camera including a first gyro sensor and a second gyro sensor for detecting rotations about two axes, respectively, which are mutually orthogonal to each other and are orthogonal to an optical axis of a photographic lens, the gyro-sensor mounting structure including a sensor mounting member which supports the first gyro sensor and the second gyro sensor; a stationary member to which the sensor mounting member is fixed and which is positioned inside the camera; three receiving portions having the same specifications formed on one of the sensor mounting member and the stationary member to lie in a plane orthogonal to the optical axis and to be positioned at three of four vertexes of an imaginary square, respectively, each side of is the imaginary square being parallel to one of the two axes; and two engaging members having the same specifications and supported by the other of the sensor mounting member and the stationary member and respectively engaged with two of the three receiving portions which are positioned at opposite ends of one of the sides of the imaginary square. According this construction, the sensor mounting member, which supports the first gyro sensor and the second gyro sensor, can be fixed to the stationary member by making the two engaging members of the same specifications engaged with two of the three receiving portions that are positioned at three of the four vertexes of an imaginary square, respectively.

It is desirable for each of the three receiving portions to include a screw hole formed in the stationary member, and for each of the engaging members to include a set screw including a male screw portion and a head portion, the set screws extending through the sensor mounting member with the male screw portions of the set screws being respectively screwed into the screw holes of the corresponding receiving portions to hold the sensor mounting member between the head portions of the set screws and the stationary member.

It is desirable for each of the three receiving portions to include a through hole formed in the sensor mounting member. Each of the engaging members includes a set screw including a male screw portion and a head portion, and passes through the stationary member and the through hole with the head portions of the set screws being in contact with the stationary member on a surface thereof opposite from the sensor mounting member. The gyro-sensor mounting structure further includes two nuts, each of which is screwed on an end of the male screw portion of a corresponding set screw that projects from the through hole to hold the sensor mounting member between the nuts and the head portions of the set screws.

It is desirable for each of the three receiving portions includes one of a through hole and a bottomed hole which is formed in one of the stationary member and the sensor mounting member. Each of the engaging members includes an engaging pin which includes an insertion portion and a head portion, at least the insertion portion being made of a resilient material. The insertion portion extends through the other of the stationary member and the sensor mounting member and is greater in diameter in a free state than the one of the through hole and the bottomed hole. The other of the stationary member and the sensor mounting member is held between the head portions of the engaging members and the one of the stationary member and the sensor mounting member with the insertion portions of the engaging pins being respectively fitted into the through holes or the bottomed holes of corresponding receiving portions.

It is desirable for the sensor mounting member to include shock absorbing members made of a resilient material which are fixed to the stationary member by corresponding the engaging members; and a gyro-sensor mounting plate which supports the first gyro sensor and the second gyro sensor and is supported by the shock absorbing members to be spaced from the stationary member.

In an embodiment, a gyro-sensor mounting structure in a camera having an image-stabilizing function, the camera including a first gyro sensor and a second gyro sensor for detecting rotations about two axes, respectively, which are mutually orthogonal to each other and are orthogonal to an optical axis of a photographic lens, the gyro-sensor mounting structure including a sensor mounting member which supports the first gyro sensor and the second gyro sensor; a stationary member to which the sensor mounting member is fixed and which is positioned inside the camera; at least one pair of receiving portions having the same specifications and formed on one of the sensor mounting member and the stationary member to lie in a plane orthogonal to the optical axis; and at least one pair of engaging members of the same specifications which are supported by the other of the sensor mounting member and the stationary member and respectively engaged with the pair of receiving portions. According to this construction, the sensor mounting member, which supports the first gyro sensor and the second gyro sensor, can be fixed to the stationary member by making a pair of engaging members of the same specifications engaged with a pair of receiving portions of the same specifications, respectively. In this case, selectable installation positions of the sensor mounting member to the stationary member are arranged at intervals of 180 degrees about the optical axis.

It is desirable for one straight line to connect two receiving portions of one of two the pairs of receiving portions and another straight line to connect two receiving portions of the other of two the pairs of receiving portions, where the one straight line and another straight line are mutually orthogonal to each other, and for the pair of engaging members to be selectively engageable with the two pairs of receiving portions.

The gyro-sensor mounting structure can be provided with two pairs of receiving portions according to this construction. Accordingly, selectable installation positions of the sensor mounting member to the stationary member are arranged at intervals of 90 degrees about the optical axis.

It is desirable for each of the receiving portions to include a screw hole formed in the stationary member, and for each of the engaging members to include a set screw including a male screw portion and a head portion, the set screws extending through the sensor mounting member with the male screw portions of the set screws being respectively screwed into the screw holes of the corresponding receiving portions to hold the sensor mounting member between the head portions of the set screws and the stationary member.

It is desirable for each of the receiving portions to include a through hole formed in the sensor mounting member. Each of the engaging members includes a set screw including a male screw portion and a head portion, and passes through the stationary member and the through hole with the head portions of the set screws being in contact with the stationary member on a surface thereof opposite from the sensor mounting member. The gyro-sensor mounting structure further includes a pair of nuts, each of which is screwed on an end of the male screw portion of a corresponding set screw that projects from the through hole to hold the sensor mounting member between the nuts and the head portions of the set screws.

It is desirable for each of the receiving portions to include one of a through hole and a bottomed hole which is formed in one of the stationary member and the sensor mounting member. Each of the engaging members includes an engaging pin which includes an insertion portion and a head portion, at least the insertion portion being made of a resilient material. The insertion portion extends through the other of the stationary member and the sensor mounting member and is greater in diameter in a free state than the one of the through hole and the bottomed hole. The other of the stationary member and the sensor mounting member is held between the head portions of the engaging members and the one of the stationary member and the sensor mounting member with the insertion portions of the engaging pins being respectively fitted into the through holes or the bottomed holes of corresponding receiving portions.

It is desirable for the sensor mounting member to include a pair of shock absorbing members made of a resilient material which are fixed to the stationary member by corresponding the engaging members, and a gyro-sensor mounting plate which supports the first gyro sensor and the second gyro sensor and is supported by the shock absorbing members to be spaced from the stationary member.

The present disclosure relates to subject matter contained in Japanese Patent Application No. 2006-283539 (filed on Oct. 18, 2006) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

In the following description, the right/left direction and the up/down direction of an embodiment of a camera 10 having an image-stabilizing function are designated by an X-direction and a Y-direction, respectively, as shown by arrows in FIGS. 1 through 4, 6 and 7.

Figure 1:
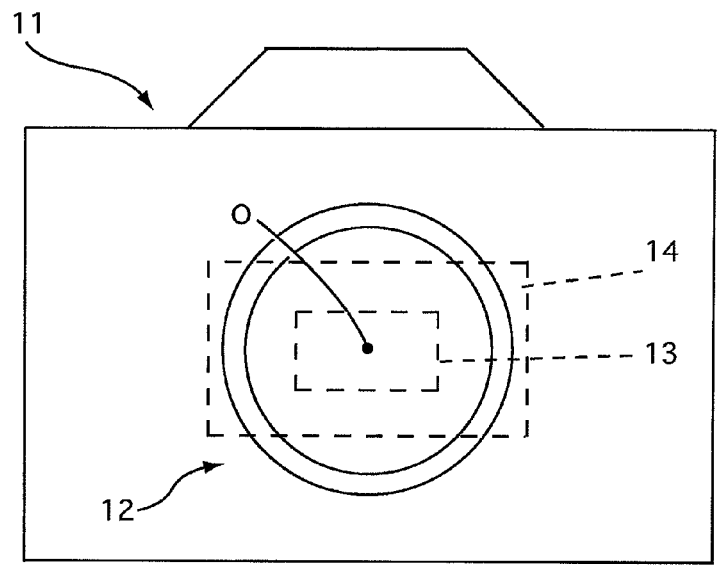
FIG. 1 is a front elevational view of an embodiment of a camera having an image-stabilizing function, according to the present invention.

As shown in FIG. 1, the camera 10 that has an image-stabilizing function is an SLR camera system. The camera 10 is composed of a camera body 11 and a lens barrel (photographic lens) 12 which is detachably attached to a central portion of the front of the camera body 11. The camera body 11 is provided therein with a movable stage (movable plate) 14, the front surface of which supports an image pickup device 13. The movable stage 14 (image pickup device 13) is movable in the X and Y directions relative to the camera body 11 from an initial position shown in FIG. 1 (at which the central point of the light receiving surface of the image pickup device and an optical axis O of the lens barrel 12 coincide with each other as viewed from the front). The camera body 11 is further provided therein with a driving device for driving the movable stage 14 in the X and Y directions. For example, this driving device can be made up of magnets and coils which produce driving force by the passage of electric current through the coils with the coils being positioned within magnetic fields of the magnets.

Figure 2:
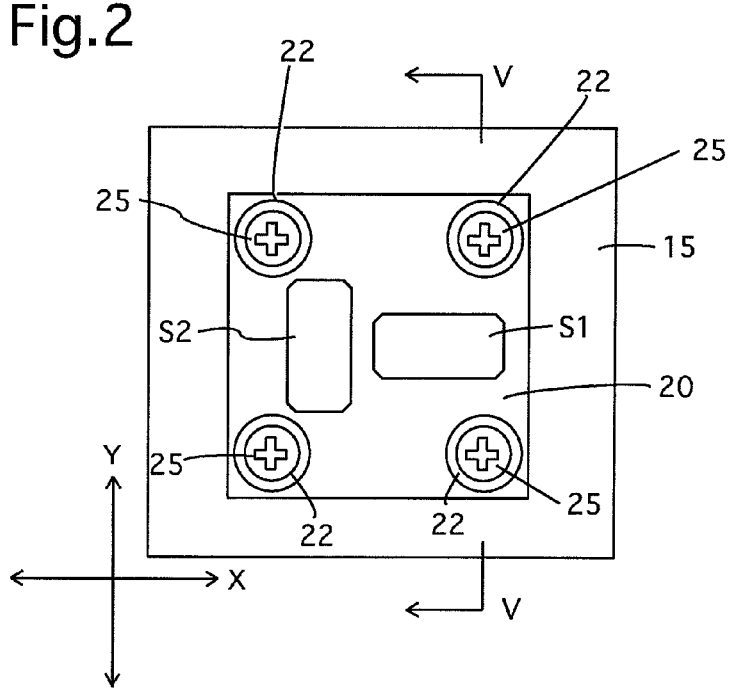
FIG. 2 is a front elevational view of an embodiment of a gyro-sensor mounting structure which includes a gyro sensor unit which is secured to a stationary member fixed to an internal surface of a camera body, showing a state of installation of the gyro sensor unit.
Figure 3:
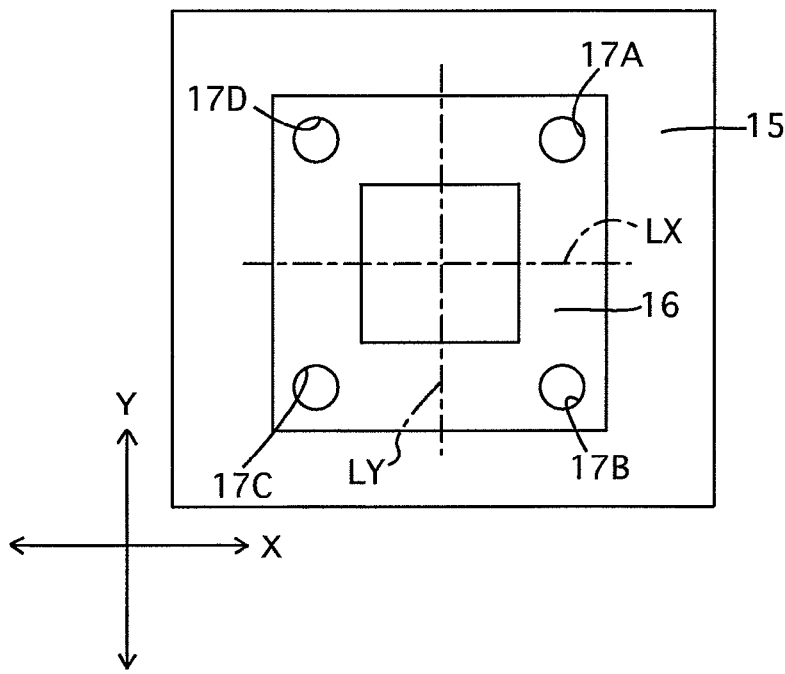
FIG. 3 is an enlarged front elevational view of the stationary member on the internal surface of the camera body.
Figure 4:
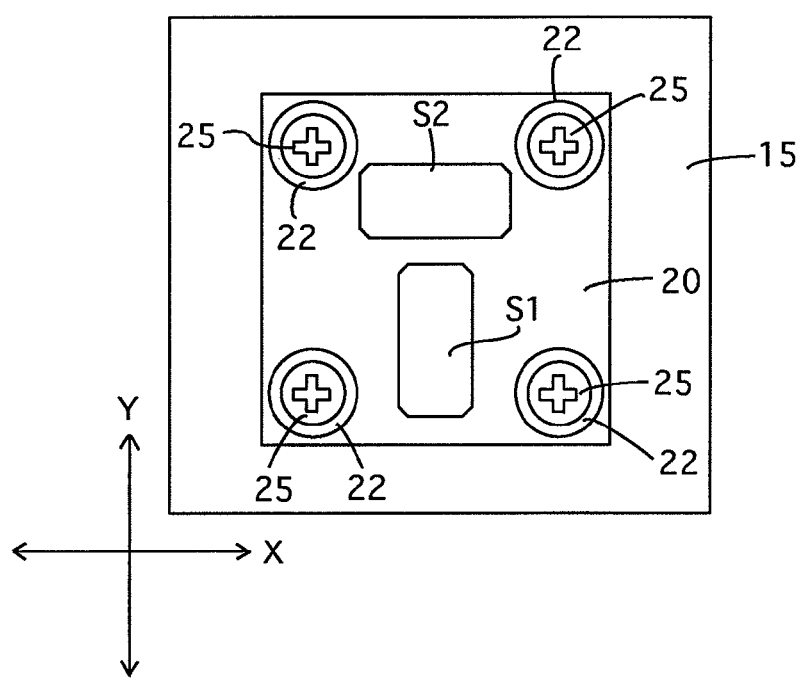
FIG. 4 is a view similar to that of FIG. 2, showing a state where a gyro-sensor mounting plate, on which two gyro sensors are mounted, has been rotated clockwise at an angle of 90 degrees from the state shown in FIG. 2.
Figure 5:
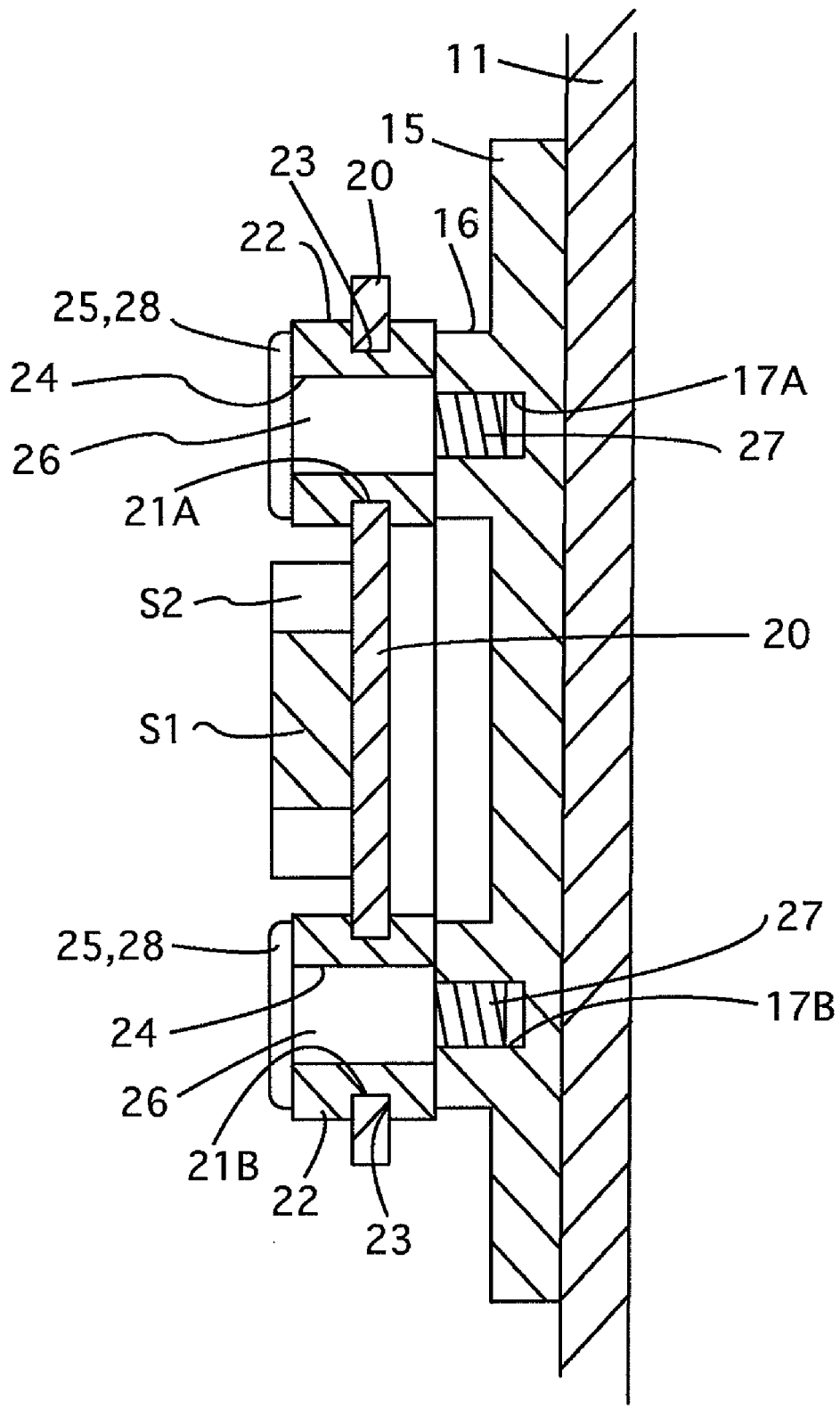
FIG. 5 is a cross sectional view taken along V-V line shown in FIG. 2.

As shown in FIGS. 2 through 7, the camera 10 is provided in the camera body 11 with a stationary member 15 which is fixed to a front surface (internal surface) of a rear wall of the camera body 11. The stationary member 15 is square in shape as viewed from the front. The stationary member 15 is provided on a front surface thereof with a frame-shaped projecting portion 16 having a square frame shape as viewed from the front as shown in FIGS. 3 and 5. The frame-shaped projecting portion 16 is provided on the front surface thereof with four screw holes 17A, 17B, 17C and 17D made under the same specifications. As shown in FIG. 3, the four screw holes (receiving portions) 17A, 17B, 17C and 17D are positioned at the four vertexes of an imaginary square (not shown in the drawing; this imaginary square lies in a plane orthogonal to the optical axis O of the lens barrel 12), respectively, as viewed from the front. Namely, both a Y-direction line which connects the two screw holes 17A and 17B and another Y-direction line which connects the two screw holes 17C and 17D extend in the Y-direction, while both an X-direction line which connects the two screw holes 17A and 17D and another X-direction line which connects the two screw holes 17B and 17C extend in the X-direction. In other words, the two screw holes 17A and 17B and the two screw holes 17C and 17D are positioned to be symmetrical with respect to a straight line LX which extends in the X-direction and passes through the center of the frame-shaped projecting portion 16, while the two screw holes 17A and 17D and the two screw holes 17B and 17C are positioned to be symmetrical with respect to a straight line LY which extends in the Y-direction and passes through the center of the frame-shaped projecting portion 16.

A gyro-sensor mounting plate (sensor mounting member) 20 which is square in shape as viewed from the front and greater in size than the frame-shaped projecting portion 16 is positioned immediately in front of the frame-shaped projecting portion 16. The gyro-sensor mounting plate 20 is provided with four fitting holes 21A, 21B, 21C and 21D which become coaxial with the four screw holes 17A, 17B, 17C and 17D, respectively, when the gyro-sensor mounting plate 20 is positioned immediately in front of the frame-shaped projecting portion 16. The specifications of the four fitting holes 21A, 21B, 21C and 21D are the same. As shown in the drawings, a first gyro sensor S1 and a second gyro sensor S2 that are provided as two gyro sensors of the same specifications are fixed to the front surface of the frame-shaped projecting portion 16. As can be seen in the drawings, each of the first gyro sensor S1 and the second gyro sensor S2 is substantially rectangular in shape as viewed from the front. The first gyro sensor S1 and the second gyro sensor S2 are elongated in two directions orthogonal to each other, respectively, as viewed from the front.

Four shock-absorbing cylinders (sensor mounting members/shock absorbing members) 22 made of a resilient material such as rubber are resiliently fitted into the four fitting holes 21A, 21B, 21C and 21D, respectively. Each of the four shock-absorbing cylinders 22 is provided on the outer peripheral surface thereof with a ring-shaped groove 23 into which the inner edge of the associated one of the four fitting holes 21A, 21B, 21C and 21D is resiliently engaged. Cylindrical-shaped central holes 24 of the four shock-absorbing cylinders 22, which extend through the shock-absorbing cylinders 22 in the forward/rearward direction, are greater in diameter than the four screw holes 17A, 17B, 17C and 17D and positioned to be coaxial with the four screw holes 17A, 17B, 17C and 17D, respectively.

The gyro-sensor mounting plate 20 is fixed to the frame-shaped projecting portion 16 of the stationary member 15 by four set screws (engaging members) 25 via the four shock-absorbing cylinders 22. The four set screws 25 have the same specifications. Each of the four set screws 25 is provided with a columnar portion 26, a male screw portion 27 and a head portion 28. The columnar portion 26 is identical in shape and size to the central hole 24 of the shock-absorbing cylinder 22, the male screw portion 27 is provided at the insertion end of the set screw 25, and the head portion 28 is greater in diameter than the central hole 24 of the shock-absorbing cylinder 22. The head portions 28 of the four set screws 25 come in contact with the front end surfaces of the four shock-absorbing cylinders 22, respectively, if the male screw portions 27 of the four set screws 25 are screwed into the four screw holes 17A, 17B, 17C and 17D with the columnar portions 26 of the four set screws 25 being fitted into the central holes 24 of the four shock-absorbing cylinders 22 in a state where the rear end surfaces of the four shock-absorbing cylinders 22 are made into surface contact with the front surface of the frame-shaped projecting portion 16 so that the central holes 24 of the four shock-absorbing cylinders 22 become coaxial with the four screw holes 17A, 17B, 17C and 17D, respectively. By doing so, the gyro-sensor mounting plate 20 is fixed to the frame-shaped projecting portion 16 (the stationary member 15) so as to be spaced from the frame-shaped projecting portion 16 with the first gyro sensor S1 and the second gyro sensor S2 being parallel to the X-direction and the Y-direction, respectively, as shown in FIG. 2.

In the above-described manner of installation of the gyro-sensor mounting plate 20 shown in FIG. 2, the first gyro sensor S1 serves as an X-axis gyro sensor for detecting the angular velocity about an X-axis (not shown) and the second gyro sensor S2 serves as a Y-axis gyro sensor for detecting the angular velocity about a Y-axis (not shown). Note that the X-axis and the Y-axis are mutually orthogonal and are orthogonal to the optical axis O. Therefore, if the movable stage 14 (the image pickup device 13) is driven in the X and Y directions by a driving force produced by the aforementioned driving device so as to cancel out camera shake (the amount thereof) of the camera body 11 in the X and Y directions which are calculated by a calculating device (not shown) of the camera 10 based on the angular velocities of the first gyro sensor S1 and the second gyro sensor S2, respectively, camera shake of the camera 10 which is caused by hand shake is corrected.

If the first gyro sensor S1 and the second gyro sensor S2 are positioned at the respective installation positions thereof shown in FIG. 2, and if vibrations caused by movements of the movable stage 14 and vibrations caused by a swing-up movement (rotation operation) of the quick-return mirror (not shown) are transmitted to the first gyro sensor S1 and the second gyro sensor S2 through the camera body 11 to exert a large influence upon the first gyro sensor S1 and the second gyro sensor S2, the gyro-sensor mounting plate 20 is manually rotated clockwise at an angle of 90 degrees relative to the frame-shaped projecting portion 16 as shown in FIG. 4 upon the four set screws 25 being removed from the four screw holes 17A, 17B, 17C and 17D and the central holes 24 of the four shock-absorbing cylinders 22, respectively, and thereafter the four set screws 25 are re-screwed into the four screw holes 17A, 17B, 17C and 17D through the central holes 24 of the four shock-absorbing cylinders 22, respectively. This re-installation operation changes the installation positions of the first gyro sensor S1 and the second gyro sensor S2 with respect to the frame-shaped projecting portion 16 of the stationary member 15 from the positions shown in FIG. 2 to the positions shown in FIG. 4, thus causing a change in manner of transmission of vibrations caused by movements of the movable stage 14 and a swing-up movement of the quick-return mirror to the first gyro sensor S1 and the second gyro sensor S2.

If the first gyro sensor S1 and the second gyro sensor S2 become less susceptible to the aforementioned vibrations when the gyro-sensor mounting plate 20 is installed to the frame-shaped projecting portion 16 of the stationary member 15 as shown in FIG. 4, the installation position of the gyro-sensor mounting plate 20 to the frame-shaped projecting portion 16 does not need to be changed again. In this case, the first gyro sensor S1 serves as a Y-axis gyro sensor for detecting the angular velocity about the aforementioned Y-axis and the second gyro sensor S2 serves as an X-axis gyro sensor for detecting the angular velocity about the aforementioned X-axis (not shown). On the other hand, if vibrations caused by movements of the movable stage 14 and vibrations caused by a swing-up movement of the quick-return mirror are still transmitted to the first gyro sensor S1 and the second gyro sensor S2 through the camera body 11 to exert a large influence upon the first gyro sensor S1 and the second gyro sensor S2 even when the gyro-sensor mounting plate 20 is installed to the frame-shaped projecting portion 16 as shown in FIG. 4, the gyro-sensor mounting plate 20 is rotated clockwise at an angle of 90 or 180 degrees relative to the frame-shaped projecting portion 16 from the state shown in FIG. 4 (this further rotation operation is not shown in the drawings).

According to the above illustrated embodiment of the gyro-sensor mounting structure, since the four screw holes 17A, 17B, 17C and 17D and the central holes 24 of the four shock-absorbing cylinders 22 are positioned at the four vertexes of an imaginary square, respectively, and since the four different installation positions of the gyro-sensor mounting plate 20 to the stationary member 15 (the frame-shaped projecting portion 16 thereof) which are set at intervals of 90 degrees about the optical axis O can be freely selected when the gyro-sensor mounting plate 20 is installed onto the stationary member 15 (the frame-shaped projecting portion 16 thereof), the installation positions of the first gyro sensor S1 and the second gyro sensor S2 can be easily changed.

Moreover, the gyro-sensor mounting structure is constructed so that vibrations of the camera body 11 are not easily transmitted to either of the first gyro sensor S1 and the second gyro sensor S2 since the gyro-sensor mounting plate 20 that supports the first gyro sensor S1 and the second gyro sensor S2 is made so as to contact the frame-shaped projecting portion 16 (the stationary member 15) via the four shock-absorbing cylinders 22 that are made of a resilient material without having the gyro-sensor mounting plate 20 come in direct contact with the frame-shaped projecting portion 16, and also since vibrations of the camera body 11 are absorbed by the four shock-absorbing cylinders 22.

Furthermore, the above illustrated embodiment of the gyro-sensor mounting structure is simple, and is accordingly achieved at a low cost.

Figure 6:
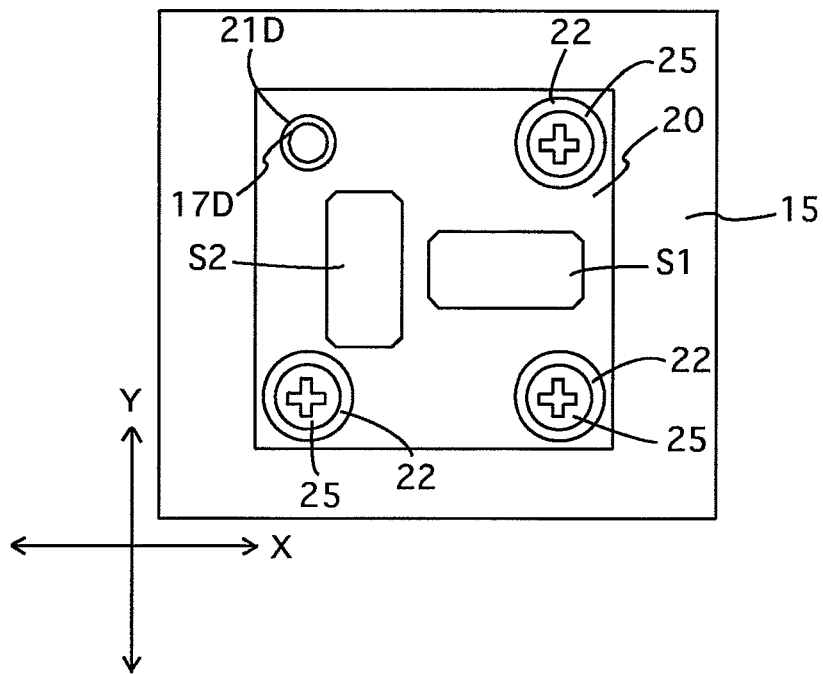
FIG. 6 is a view similar to that of FIG. 2, showing a first modified embodiment of the gyro-sensor mounting structure.
Figure 7:
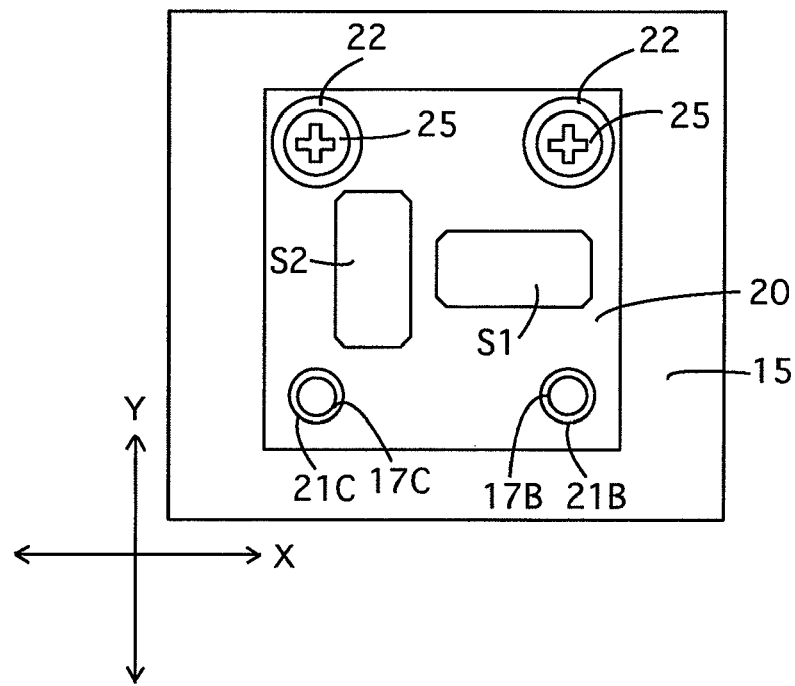
FIG. 7 is a view similar to that of FIG. 2, showing a second modified embodiment of the gyro-sensor mounting structure.

Although the gyro-sensor mounting plate 20 is secured to the frame-shaped projecting portion 16 by the four set screws 25 in the above illustrated embodiment of the gyro-sensor mounting structure, the gyro-sensor mounting plate 20 can be secured to the frame-shaped projecting portion 16 by two or three set screws 25 as shown in FIGS. 6 and 7.

Although not shown in the drawings, the number of screw holes (each of which corresponds to each of the four screw holes 17A, 17B, 17C and 17D) formed in the stationary member 15 (the frame-shaped projecting portion 16) can be three while only two set screws 25 can be screwed into two of the three screw holes, which are positioned at the opposite ends of either a Y-direction side or an X-direction side of an imaginary square, through corresponding two fitting holes formed in the gyro-sensor mounting plate 20 and corresponding the two central holes 24 of the four shock-absorbing cylinders 22. In this case, the number of selectable installation positions of the gyro-sensor mounting plate 20 (the first gyro sensor S1 and the second gyro sensor S2) with respect to the frame-shaped projecting portion 16 of the stationary member 15 is two (at intervals of 90 degrees).

Figure 8:
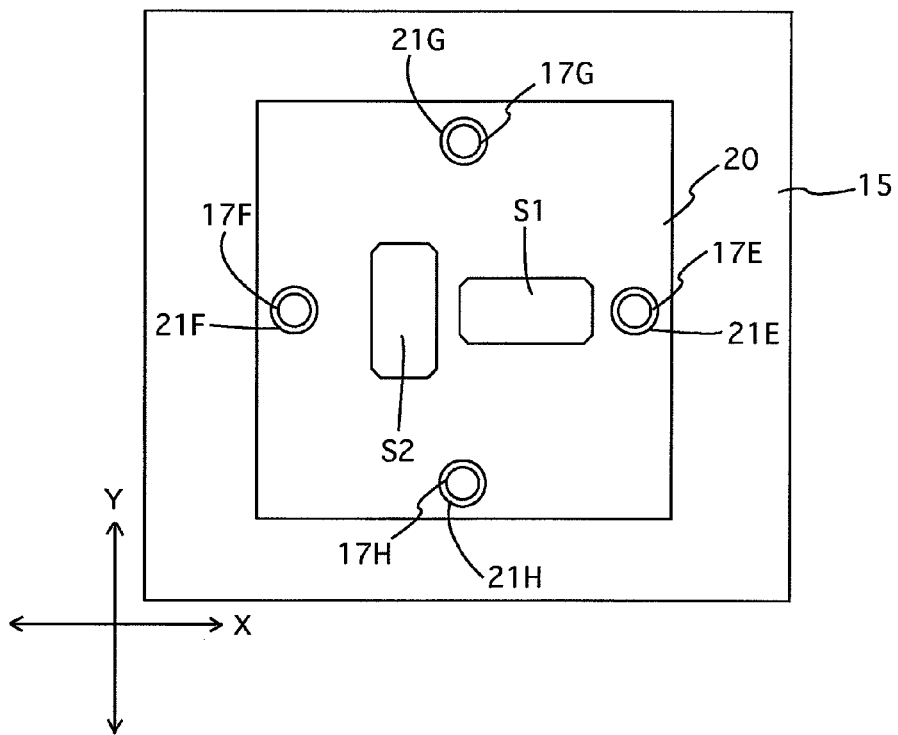
FIG. 8 is a view similar to that of FIG. 2, showing a third modified embodiment of the gyro-sensor mounting structure with a pair of set screws shown in FIG. 9 for securing the gyro-sensor mounting plate to the stationary member being removed.
Figure 9:
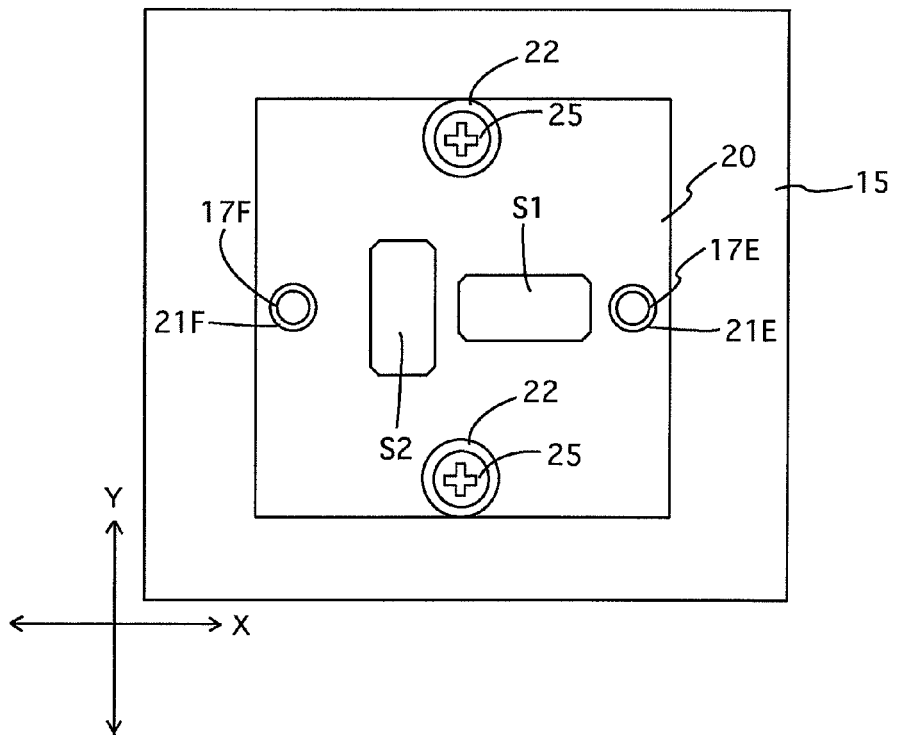
FIG. 9 is a view similar to that of FIG. 2, showing the third modified embodiment of the gyro-sensor mounting structure with the pair of set screws being screwed into the stationary member.

Additionally, as shown in FIGS. 8 and 9, it is possible for two pairs of screw holes (17E and 17F, and 17G and 17H) having substantially the same specifications to be formed in the frame-shaped projecting portion 16 and for corresponding two pairs of fitting holes (21E and 21F, and 21G and 21H) having substantially the same specifications to be formed in the gyro-sensor mounting plate 20. The distance between the pair of screw holes 17E and 17F in the X-direction and the distance between the pair of screw holes 17G and 17H in the Y-direction are mutually identical. An X-direction straight line which connects the pair of screw holes 17E and 17F and a Y-direction straight line which connects the pair of screw holes 17G and 17H are mutually orthogonal. The distance between the pair of fitting holes 21E and 21F in the X-direction and the distance between the pair of fitting holes 21G and 21H in the Y-direction are mutually identical. An X-direction straight line which connects the pair of fitting holes 21E and 21F and a Y-direction straight line which connects the pair of fitting holes 21G and 21H are mutually orthogonal.

In this modified embodiment shown in FIGS. 8 and 9, the gyro-sensor mounting plate 20 can be fixed to the stationary member 15 if one set screw 25 is screwed into the screw hole 17G via the fitting hole 21G while one set screw 25 is screwed into the screw hole 17H via the fitting hole 21H.

In addition, for instance, the gyro-sensor mounting plate 20 can be fixed to the stationary member 15 with the gyro-sensor mounting plate 20 rotated relative to the frame-shaped projecting portion 16 at an angle of 180 degrees from the state shown in FIGS. 8 and 9 if the gyro-sensor mounting plate 20 is rotated relative to the frame-shaped projecting portion 16 at an angle of 180 degrees from the state shown in FIGS. 8 and 9 and thereafter one set screw 25 is screwed into the screw hole 17G via the fitting hole 21G while one set screw 25 is screwed into the screw hole 17H via the fitting hole 21H. Additionally, the gyro-sensor mounting plate 20 can be fixed to the stationary member 15 with the gyro-sensor mounting plate 20 rotated clockwise relative to the frame-shaped projecting portion 16 at an angle of 90 degrees from the state shown in FIGS. 8 and 9 if the gyro-sensor mounting plate 20 is rotated clockwise relative to the frame-shaped projecting portion 16 at an angle of 90 degrees from the state shown in FIGS. 8 and 9 and thereafter one set screw 25 is screwed into the screw hole 17E via the fitting hole 21G while one set screw 25 is screwed into the screw hole 17F via the fitting hole 21H.

Although not shown in the drawings, the number of screw holes formed in the stationary member 15 (the frame-shaped projecting portion 16) can be two (e.g., only the two screw holes 17G and 17H) while the number of fitting holes formed in the gyro-sensor mounting plate 20 can be two (e.g., only the two fitting holes 21G and 21H). In this case, the following two installation manners are possible: one set screw 25 is screwed into the screw hole 17G via the fitting hole 21G while one set screw 25 is screwed into the screw hole 17H via the fitting hole 21H in one installation manner, and one set screw 25 is screwed into the screw hole 17G via the fitting hole 21H while one set screw 25 is screwed into the screw hole 17H via the fitting hole 21G. Therefore, the two different installation positions of the gyro-sensor mounting plate 20 to the stationary member 15 which are set at intervals of 180 degrees about the optical axis O can be freely selected when the gyro-sensor mounting plate 20 is installed onto the stationary member 15.

Additionally, as shown in FIGS. 10 through 13, if three through holes (FIG. 13) or four through holes 40 (FIGS. 10 through 12) are formed in the stationary member 15 (from which the frame-shaped projecting portion 16 is excluded) to be positioned at three or four vertexes of an imaginary square, respectively, if the rear end surfaces of two, three or four shock-absorbing cylinders 22 (specifically the rear end surfaces of two shock-absorbing cylinders 22 positioned at the opposite ends of either a Y-direction side or an X-direction side of the imaginary square in the case where the number of shock-absorbing cylinders 22 is two) are made to contact the front surface of the frame-shaped projection portion 16 (around the corresponding two, three or four through holes 40, respectively), and if two, three or four set screws 42 with head portions 41 are inserted into the two, three or four shock-absorbing cylinders 22 and the associated two, three or four through holes 40, respectively, from the back of the stationary member 15 while two, three or four nuts 43 are screwed on the male threaded portions (front end portions) of the two, three or four set screws 42, respectively, it is possible for the four shock-absorbing cylinders 22 and the stationary member 15 to be held between the head portions 41 of the two, three or four set screws 42 and the two, three or four nuts 43 (in this case, the central holes 24 of the four shock-absorbing cylinders 22 serve as receiving portions).

Figure 10:
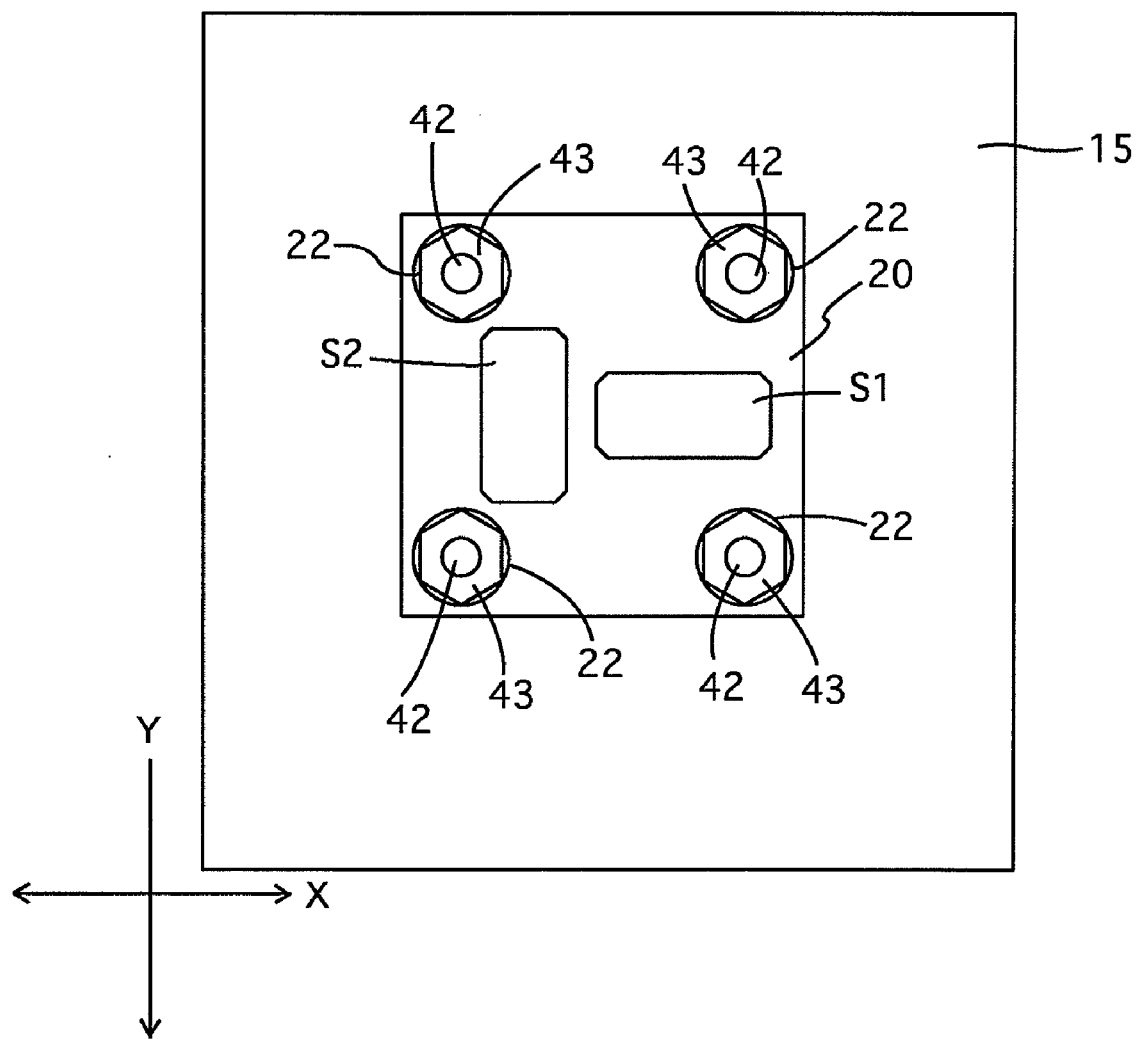
FIG. 10 is a view similar to that of FIG. 2, showing a fourth modified embodiment of the gyro-sensor mounting structure having four receiving portions.
Figure 11:
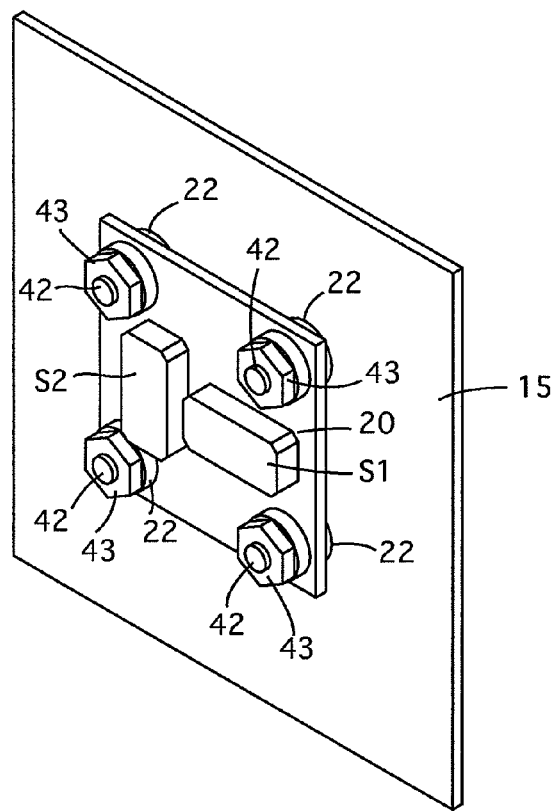
FIG. 11 is a perspective view of the fourth modified embodiment of the gyro-sensor mounting structure having four receiving portions, shown in FIG. 10.
Figure 12:
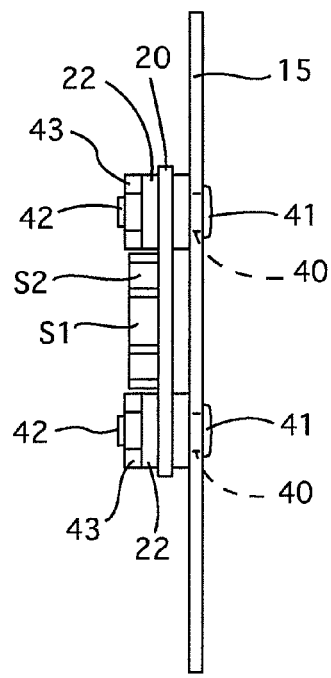
FIG. 12 is a side elevational view of the fourth modified embodiment of the gyro-sensor mounting structure having four receiving portions, shown in FIG. 10.
Figure 13:
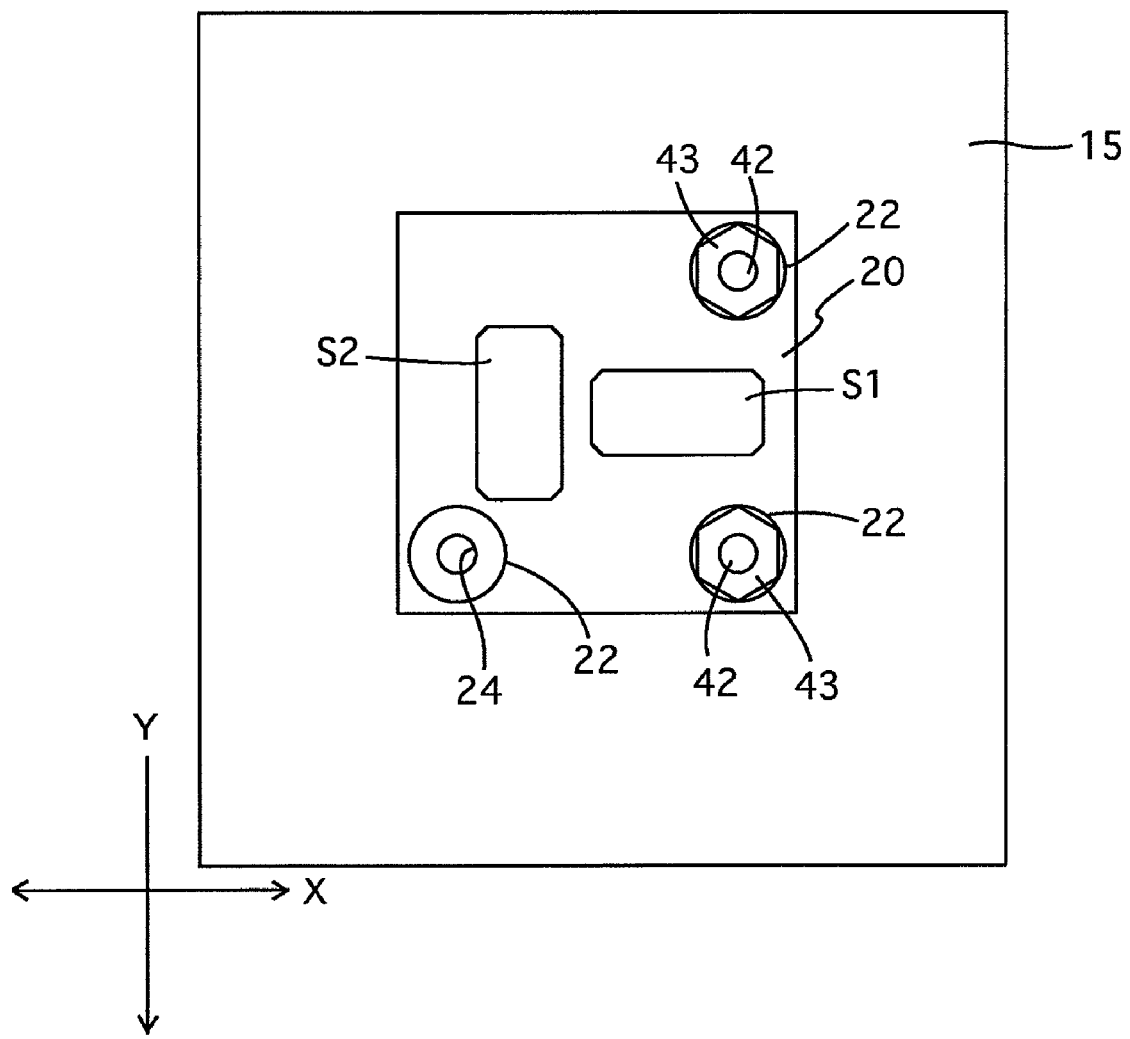
FIG. 13 is a view similar to that of FIG. 2, showing a fourth modified embodiment of the gyro-sensor mounting structure having three receiving portions.

Note that this modified embodiment of the gyro-sensor mounting structure shown in FIGS. 10 through 12, in which the central holes 24 of the four shock-absorbing cylinders 22 serve as receiving portions, is applicable to each of the above described modified embodiments of the gyro-sensor mounting structures shown in FIGS. 6 through 9.

Figure 14:
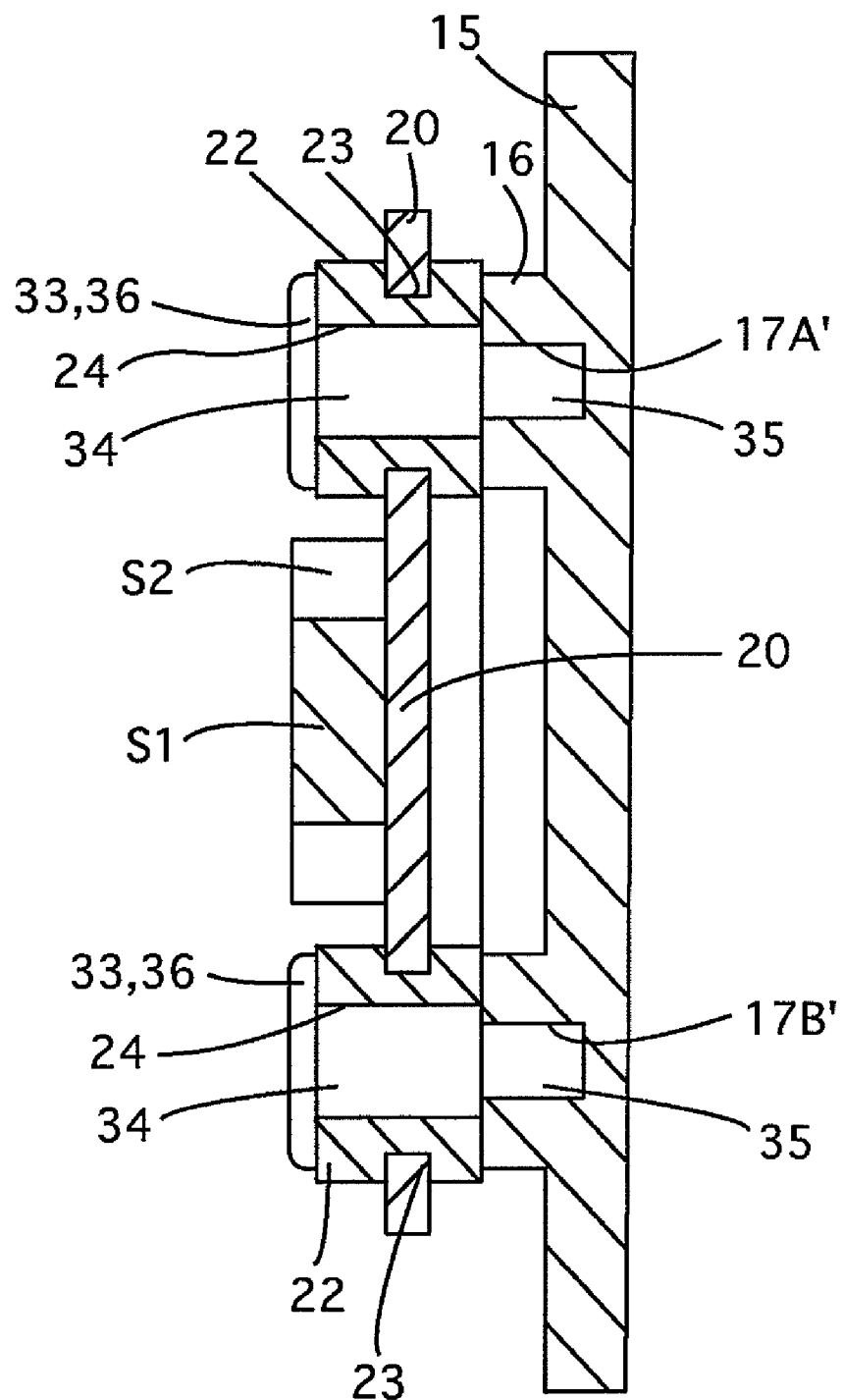
FIG. 14 is a view similar to that of FIG. 5, showing a fifth modified embodiment of the gyro-sensor mounting structure.

In addition, as shown in FIG. 14, it is possible that the frame-shaped projecting portion 16 be provided, at four positions respectively corresponding to the four screw holes 17A, 17B, 17C and 17D, with four insertion holes (bottomed holes; receiving portions) 17A', 17B', 17C' and 17D' (the insertion holes 17C' and 17D' are not shown in FIG. 14) instead of the four screw holes 17A, 17B, 17C and 17D, and that two, three or four engaging pins (engaging members) 33, each of which includes a large-diameter portion 34 having substantially the same dimensions as the columnar portion 26 of each set screw 25, a small-diameter portion (insertion portion) 35 having substantially the same dimensions as each insertion holes 17A', 17B', 17C' and 17D' and a head portion 36 having the same dimensions as the head portion 28 of each set screw 25, be provided to fix the two, three or four shock-absorbing cylinders 22 and the gyro-sensor mounting plate 20 between the head portions 36 and the frame-shaped projecting portion 16 by fitting the small-diameter portions 35 of the two, three or four engaging pins 33 into the two, three or four insertion holes 17A', 17B', 17C' and 17D' while fitting the large-diameter portions 34 of the two, three or four engaging pins 33 into the central holes 24 of the two, three or four shock-absorbing cylinders 22. In this case, each engaging pin 33 is made of a resilient material such as rubber so that the diameter of the large-diameter portion 34 in a free state is slightly greater than the diameter of the central hole 24 of each shock-absorbing cylinder 22 and so that the diameter of the small-diameter portion 35 in a free state is slightly greater than the diameter of each insertion hole 17A', 17B', 17C' and 17D'. This design makes it difficult for the large-diameter portion 34 and the small-diameter portion 35 of each engaging pin 33 to come out of the central hole 24 of the associated shock-absorbing cylinder 22 and the associated insertion hole 17A', 17B', 17C' or 17D', respectively, when the large-diameter portion 34 and the small-diameter portion 35 of each engaging pin 33 are fitted into the associated central holes 24 and the associated insertion hole 17A', 17B', 17C' or 17D', respectively.

The shock-absorbing cylinders 22 and the engaging pins 33 can be formed integral with each other, respectively, so that the small-diameter portion 35 of each engaging pin 33 projects rearward from the associated shock-absorbing cylinder 22.

Although the four screw holes 17A, 17B, 17C and 17D and the four insertion holes 17A', 17B', 17C' and 17D' are all formed as bottomed holes in the above illustrated embodiments of the gyro-sensor mounting structures, each of these screw holes and insertion holes can be formed as a through hole.

Although not shown in the drawings, a bottomed hole (insertion hole) which corresponds to each insertion hole 17A', 17B', 17C' and 17D' and a through hole which corresponds to the central hole 24 of each shock-absorbing cylinder 22 can be formed in the rear end of each shock-absorbing cylinder 22 and the stationary member 15, respectively, so that a pin corresponding to each engaging pin 33 is inserted into the through hole and the bottomed hole from the back of the stationary member 15.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A gyro-sensor mounting structure in a camera having an image-stabilizing function, said camera including a first gyro sensor and a second gyro sensor for detecting rotations about two axes, respectively, which are mutually orthogonal to each other and orthogonal to an optical axis of a photographic lens, said gyro-sensor mounting structure comprising:

a sensor mounting member which supports said first gyro sensor and said second gyro sensor;

a stationary member to which said sensor mounting member is fixed and which is positioned inside said camera;

four receiving portions having the same specifications formed on one of said sensor mounting member and said stationary member to lie in a plane orthogonal to said optical axis and to be positioned at four vertexes of an imaginary square, respectively, a side of said imaginary square being parallel to one of said two axes; and at least two and no more than four engaging members having the same specifications and supported by the other of said sensor mounting member and said stationary member and respectively engaged with corresponding said receiving portions to define an initial installation position, wherein, upon removal of said engaging members from said receiving portions, said sensor mounting member is configured to be manually rotated relative to said stationary member at a 90° interval and remounted on said stationary member, through reengagement of said engaging members with said receiving portions, such that said first gyro sensor and said second gyro sensor are reinstalled at a position that is different from said initial installation position.

2. The gyro-sensor mounting structure according to claim 1, wherein each of said four receiving portions comprises a screw hole formed in said stationary member, and wherein each of said engaging members comprises a set screw including a male screw portion and a head portion, said set screws extending through said sensor mounting member with said male screw portions of said set screws being respectively screwed into said screw holes of said corresponding receiving portions to hold said sensor mounting member between said head portions of said set screws and said stationary member.

3. The gyro-sensor mounting structure according to claim 1, wherein each of said four receiving portions comprises a through hole formed in said sensor mounting member, wherein each of said engaging members comprises a set screw including a male screw portion and a head portion, and passes through said stationary member and said through hole with said head portions of said set screws being in contact with said stationary member on a surface thereof opposite from said sensor mounting member, and wherein said gyro-sensor mounting structure further comprises at least two and no more than four nuts, each of which is screwed on an end of said male screw portion of a corresponding set screw that projects from said through hole to hold said sensor mounting member between said nuts and said head portions of said set screws.

4. The gyro-sensor mounting structure according to claim 1, wherein each of said four receiving portions comprises one of a through hole and a bottomed hole which is formed in one of said stationary member and said sensor mounting member, wherein each of said engaging members comprises an engaging pin which includes an insertion portion and a head portion, at least said insertion portion being made of a resilient material, wherein said insertion portion extends through the other of said stationary member and said sensor mounting member and is greater in diameter in a free state than said one of said through hole and said bottomed hole, and wherein said other of said stationary member and said sensor mounting member is held between said head portions of said engaging members and said one of said stationary member and said sensor mounting member with said insertion portions of said engaging pins being respectively fitted into said through holes or said bottomed holes of corresponding said receiving portions.

5. The gyro-sensor mounting structure according to claim 1, wherein said sensor mounting member comprises:

at least two and no more than four shock absorbing members made of a resilient material which are fixed to said stationary member by corresponding said engaging members; and a gyro-sensor mounting plate which supports said first gyro sensor and said second gyro sensor and is supported by said shock absorbing members to be spaced from said stationary member.

6. The gyro-sensor mounting structure according to claim 1, wherein said stationary member comprises a frame-shaped projecting portion which projects from a front surface of said stationary member, said four receiving portions being formed on a front surface of said frame-shaped projecting portion.

7. The gyro-sensor mounting structure according to claim 1, wherein said stationary member is fixed to an internal surface of a rear wall of a camera body of said camera.

8. The gyro-sensor mounting structure according to claim 1, wherein said sensor mounting member comprises:

shock absorbing members made of a resilient material which are fixed to said stationary member by corresponding said engaging members; and a gyro-sensor mounting plate which supports said first gyro sensor and said second gyro sensor and is supported by said shock absorbing members to be spaced from said stationary member.

9. The gyro-sensor mounting structure according to claim 5, wherein said gyro-sensor mounting plate is square in shape as viewed from front of said camera.

10. The gyro-sensor mounting structure according to claim 5, wherein each of said shock absorbing members is formed in a cylinder.

11. A gyro-sensor mounting structure in a camera having an image-stabilizing function, said camera including a first gyro sensor and a second gyro sensor for detecting rotations about two axes, respectively, which are mutually orthogonal to each other and are orthogonal to an optical axis of a photographic lens, said gyro-sensor mounting structure comprising:

a sensor mounting member which supports said first gyro sensor and said second gyro sensor;

a stationary member to which said sensor mounting member is fixed and which is positioned inside said camera;

three receiving portions having the same specifications formed on one of said sensor mounting member and said stationary member to lie in a plane orthogonal to said optical axis and to be positioned at three of four vertexes of an imaginary square, respectively, each side of said imaginary square being parallel to one of said two axes; and two engaging members having the same specifications and supported by the other of said sensor mounting member and said stationary member and respectively engaged with two of said three receiving portions which are positioned at opposite ends of one of said sides of said imaginary square.

12. The gyro-sensor mounting structure according to claim 11, wherein each of said three receiving portions comprises a screw hole formed in said stationary member, and wherein each of said engaging members comprises a set screw including a male screw portion and a head portion, said set screws extending through said sensor mounting member with said male screw portions of said set screws being respectively screwed into said screw holes of said corresponding said receiving portions to hold said sensor mounting member between said head portions of said set screws and said stationary member.

13. The gyro-sensor mounting structure according to claim 11, wherein each of said three receiving portions comprises a through hole formed in said sensor mounting member,
- wherein each of said engaging members comprises a set screw including a male screw portion and a head portion, and passes through said stationary member and said through hole with said head portions of said set screws being in contact with said stationary member on a surface thereof opposite from said sensor mounting member, and
- wherein said gyro-sensor mounting structure further comprises two nuts, each of which is screwed on an end of said male screw portion of a corresponding set screw that projects from said through hole to hold said sensor mounting member between said nuts and said head portions of said set screws.

14. The gyro-sensor mounting structure according to claim 11, wherein each of said three receiving portions comprises one of a through hole and a bottomed hole which is formed in one of said stationary member and said sensor mounting member,
- wherein each of said engaging members comprises an engaging pin which includes an insertion portion and a head portion, at least said insertion portion being made of a resilient material,
- wherein said insertion portion extends through the other of said stationary member and said sensor mounting member and is greater in diameter in a free state than said one of said through hole and said bottomed hole, and
- wherein said other of said stationary member and said sensor mounting member is held between said head portions of said engaging members and said one of said stationary member and said sensor mounting member with said insertion portions of said engaging pins being respectively fitted into said through holes or said bottomed holes of corresponding said receiving portions.

15. A gyro-sensor mounting structure in a camera having an image-stabilizing function, said camera including a first gyro sensor and a second gyro sensor for detecting rotations about two axes, respectively, which are mutually orthogonal to each other and are orthogonal to an optical axis of a photographic lens, said gyro-sensor mounting structure comprising:
- a sensor mounting member which supports said first gyro sensor and said second gyro sensor;
- a stationary member to which said sensor mounting member is fixed and which is positioned inside said camera;
- at least one pair of receiving portions having the same specifications and formed on one of said sensor mounting member and said stationary member to lie in a plane orthogonal to said optical axis; and
- at least one pair of engaging members of the same specifications which are supported by the other of said sensor mounting member and said stationary member and respectively engaged with said pair of receiving portions,
- wherein one straight line connects two receiving portions of one of two said pairs of receiving portions and another straight line connects two receiving portions of the other of two said pairs of receiving portions, where said one straight line and another straight line are mutually orthogonal to each other,
- wherein said pair of engaging members are selectively engageable with said two pairs of receiving portions to define an initial installation position, and
- wherein, upon removal of said engaging members from said receiving portions, said sensor mounting member is configured to be manually rotated relative to said stationary member at a 90° interval and remounted on said stationary member, through reengagement of said engaging members with said receiving portions, such that said first gyro sensor and said second gyro sensor are reinstalled at a position that is different from said initial installation position.

16. The gyro-sensor mounting structure according to claim 15, wherein each of said receiving portions comprises a screw hole formed in said stationary member, and
- wherein each of said engaging members comprises a set screw including a male screw portion and a head portion, said set screws extending through said sensor mounting member with said male screw portions of said set screws being respectively screwed into said screw holes of said corresponding said receiving portions to hold said sensor mounting member between said head portions of said set screws and said stationary member.

17. The gyro-sensor mounting structure according to claim 15, wherein each of said receiving portions comprises a through hole formed in said sensor mounting member,
- wherein each of said engaging members comprises a set screw including a male screw portion and a head portion, and passes through said stationary member and said through hole with said head portions of said set screws being in contact with said stationary member on a surface thereof opposite from said sensor mounting member, and
- wherein said gyro-sensor mounting structure further comprises a pair of nuts, each of which is screwed on an end of said male screw portion of a corresponding set screw that projects from said through hole to hold said sensor mounting member between said nuts and said head portions of said set screws.

18. The gyro-sensor mounting structure according to claim 15, wherein each of said receiving portions comprises one of a through hole and a bottomed hole which is formed in one of said stationary member and said sensor mounting member,
- wherein each of said engaging members comprises an engaging pin which includes an insertion portion and a head portion, at least said insertion portion being made of a resilient material,
- wherein said insertion portion extends through the other of said stationary member and said sensor mounting member and is greater in diameter in a free state than said one of said through hole and said bottomed hole, and
- wherein said other of said stationary member and said sensor mounting member is held between said head portions of said engaging members and said one of said stationary member and said sensor mounting member with said insertion portions of said engaging pins being respectively fitted into said through holes or said bottomed holes of corresponding said receiving portions.

19. The gyro-sensor mounting structure according to claim 15, wherein said sensor mounting member comprises:
- a pair of shock absorbing members made of a resilient material which are fixed to said stationary member by corresponding said engaging members; and
- a gyro-sensor mounting plate which supports said first gyro sensor and said second gyro sensor and is supported by said shock absorbing members to be spaced from said stationary member.

* * * * *